United States Patent [19]

F'Geppert

[11] 3,974,708

[45] Aug. 17, 1976

[54] CONSTANT FORCE BELT TENSIONER

[75] Inventor: Erwin F'Geppert, Novi, Mich.

[73] Assignee: The United States of America as represented by the Secretary of the Army, Washington, D.C.

[22] Filed: Sept. 17, 1975

[21] Appl. No.: 614,282

[52] U.S. Cl. .................... 74/242.1 A; 74/242.11 C; 74/242.14 R
[51] Int. Cl.² ........................ F16H 7/12; F16H 7/10
[58] Field of Search ............ 74/242.11 C, 242.11 A, 74/242.1 A, 242.14 R

[56] References Cited
UNITED STATES PATENTS

| | | | |
|---|---|---|---|
| 3,028,693 | 4/1962 | Malzahn | 74/242.14 X |
| 3,113,467 | 12/1963 | McKenna | 74/242.14 |
| 3,763,715 | 10/1973 | Pollard et al. | 74/242.1 A |

Primary Examiner—Leonard H. Gerin
Attorney, Agent, or Firm—Peter A. Taucher; John E. McRae; Nathan Edelberg

[57] ABSTRACT

A belt tensioner comprising a constant force spring trained between a stationary support means and a belt-engaged pulley. A slideway is provided to promote relatively frictionless movement of the pulley across the belt path.

10 Claims, 5 Drawing Figures

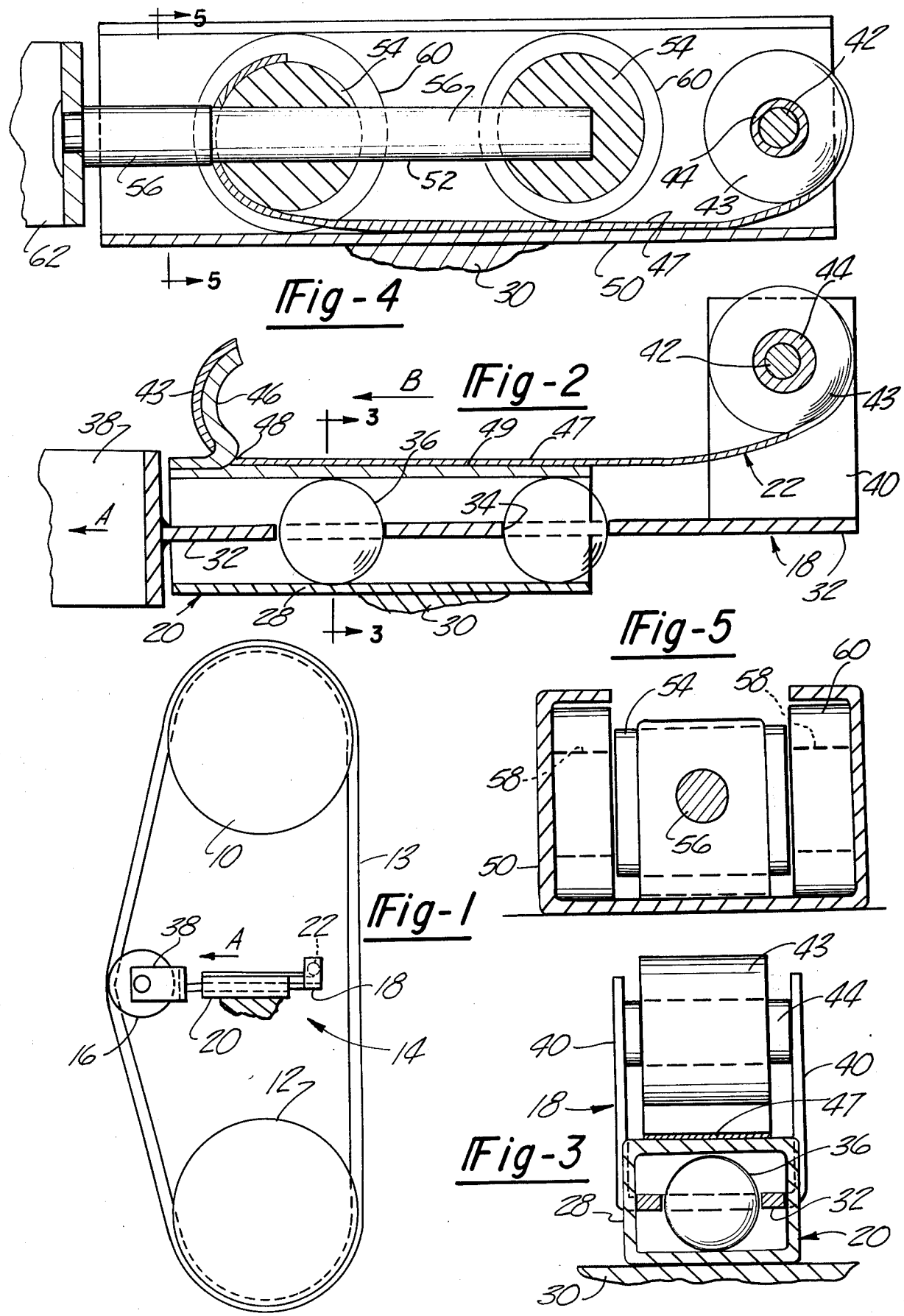

CONSTANT FORCE BELT TENSIONER

The invention described herein may be manufactured, used, and licensed by or for the Government for governmental purposes without payment to me of any royalty thereon.

BACKGROUND AND SUMMARY OF THE INVENTION

This invention relates to mechanism for maintaining a predetermined tautness in a conventional drive belt interposed between drive and driven pulley elements. Previous belt tension (tautness) devices known to applicant utilize springs having positive spring rates. When such springs are used the belt tension device delivers the required or specified force only at one deflected condition. If the device is adjusted to apply proper belt tension force when the belt is first installed then after a period of time any belt stretch or wear will cause the device to deliver an insufficient force to take up belt slack. The device must periodically be readjusted manually.

In practice new drive belts are often installed with belt-tension device set to slightly overtension the belt; as the belt wears and elongates the tension is automatically reduced to the desired value, and then later to an undesirably low value. For example, if the "proper" tension is eight pounds the belt-tension device may be initially set at ten pounds; when the belt stretches a sufficient amount the tension drops down to the desired eight pounds. Unfortunately this eight pound condition occurs for only a relatively brief period; usually the tension continues to decrease to a lower value, for example six pounds, thereby tending to promote belt slippage and frictional wear.

In the present invention a zero rate constant force spring provides the belt-tension force. Therefore the device can be initially set at the desired value, for example eight pounds, with the assurance that it will remain at the initial force setting even though the belt may elongate over a period of time.

THE DRAWINGS

FIG. 1 is a belt type power transmission system using the invention.

FIG. 2 is a fragmentary sectional view of a belt tensioner used in the FIG. 1 system.

FIG. 3 is a sectional view on line 3—3 in FIG. 2.

FIG. 4 is a fragmentary sectional view of another belt tensioner embodying the inventive concept.

FIG. 5 is a sectional view on line 5—5 in FIG. 4.

The power transmission system of FIG. 1 comprises a drive pulley 10, a driven pulley 12, and an endless drive belt 13 trained therearound. The belt is maintained in a taut condition by means of a belt tension device 14 which includes an idler pulley 16, a movable slide element 18, and a stationary slideway 20. A coiled spiral strip spring 22 is trained between the slide element 18 and slideway 20 to exert a constant force tending to move element 18 in the arrow A direction.

As seen in FIGS. 2 and 3, slideway 20 comprises a rectangular tube 28 immovably located on a bracket 30 or other fixed structure. Slide element 18 comprises a plate 32 having two circular openings 34 which captively receive anti-friction ball elements 36. The left end of plate 32 is attached to a U-shaped yoke 38 that rotatably supports the aforementioned idler pulley 16 (FIG. 1). The right end of plate 32 includes two upstanding walls 40 that rigidly support a non-rotary shaft 42. A bushing 44 rotatably encircles shaft 42 to form a drum type mount for a constant force spring 22.

The constant force spring is formed as a pre-stressed strip of high carbon steel spring stock 43 tightly coiled around bushing 44 toward a condition of minimum radius of curvature; the spring strip thereby tightly encircles the bushing and successive strip convolutions wound thereon. As seen in FIG. 2, the unwound portion 47 of the spring strip lies against a flat reaction surface 49 defined by the roof area of tube 28. The tube carries an anchorage element 46 that extends through a slot 48 in spring strip 43.

Spring strip 43 is a commercially available spring element marketed by Hunter Spring Division of Ametek Inc. under the trade name "Negator". It has the characteristic of providing a constant wind-up force irrespective of the deflection (length of the unwound portion 47). It is necessary however that the unwound portion of the spring strip be stabilized or immobilized so that the wind-up force is confined and directed parallel to the intended movement direction of the slide element. In the FIG. 2 arrangement reaction surface 49 immobilizes the unwound portion of the spring strip against any tendency to bow or coil; therefore the wind-up force (derived from the applied pre-stress) is directed along directional line B that parallels the movement direction A of slide element 18.

FIG. 2 illustrates slide element 18 in a position biased rightwardly by reason of the tautness in belt 13 (FIG. 1); pulley 16 exerts a rightward force on the slide element that is opposed and balanced by the wind-up force of the spring. Should the belt wear or elongate slide element 18 will be moved leftwardly under the spring bias. The spring imposes a constant force on the slide element so that the belt has the same tension (tautness) irrespective of the extent of belt elongation.

FIGS. 4 and 5 illustrate a second embodiment of the invention wherein the stationary slideway takes the forming of a channel 50. In this case the coiled spring is mounted on a non-rotary shaft 42 carried by the slideway. The free exposed portion of spring strip 43 is anchored to the slide element 52, which is defined by two transverse bars 54 and a longitudinal rod 56 having a press fit in each bar 54. The ends of bars 54 are machined to reduced diameters, as at 58, to form mounting surfaces for anti-friction rollers 60 that roll within the slideway channel 50. Rod 56 extends through an opening in the spring strip to form the desired anchorage for the unwound portion of the spring strip. The floor of channel 50 forms a reaction surface for immobilizing the strip in the desired fashion.

The belt-engaged idler pulley (not shown in the drawings) is mounted on an L-shaped plate 62 attached to the slide element. Spring wind-up force is applied to the slide element in a left-to-right direction. Therefore the idler pulley is located outside the run of the belt so that the tensioned belt exerts a right-to-left force that is opposed and balanced by the spring force.

In both embodiments of the invention a constant force (zero rate) spring means is employed to maintain the same belt tautness in a range of slide element positions. The stroke of the slide element is made sufficient to accommodate expected belt elongation for normal belt life.

In many conventional arrangements the center distance between the drive and driven pulleys is make adjustable to provide compensation for many of the aforementioned in-service problems, as well as replacement or removal of the belt. Use of the instant invention would negative the need for such adjustable centers and the associated mechanisms.

I wish it to be understood that I do not desire to be limited to the exact details of construction shown and described for obvious modifications will occur to a person skilled in the art.

I claim:

1. In a power transmission system comprising a drive pulley, a driven pulley, and a power-transmitting belt trained around said pulleys: the improvement comprising means for maintaining the belt in a taught condition irrespective of changes in belt length or belt wear; said improved means including a belt-engaged idler pulley means capable of bodily displacement across the belt path, a stationary support means, and a zero rate spring means trained between the idler pulley means and stationary support means to maintain a constant predetermined displacement force throughout the permissible range of idler pulley positions.

2. In the system of claim 1: said zero rate spring means comprising a rotatable drum, and a strip of spring stock coiled thereon; said spring strip being pre-stressed toward a condition of minimum radius of curvature wherein the strip tightly encircles the drum; the drum being rotatably attached to one of said stationary support means and the idler pulley means; the exposed end of the spring strip being anchored to the other of said stationary support means and idler pulley means.

3. In the system of claim 2; said stationary support means including a slideway defining a movement axis transverse to the drum axis; said pulley means including a slide element movable on the slideway along the movement axis as the spring strip winds on or unwinds from the drum; the strip unwinding action being produced as a response of the idler pulley means to an excessively taut belt condition; the strip winding action being produced as a response of the idler pulley means to an excessively loose belt condition.

4. In the system of claim 3: one of said slideway and slide element having a flat reaction surface receiving the outer surface area of the unwound portion of the spring strip; said reaction surface extending parallel to the slideway movement axis, whereby the strip windup force is directed along said axis.

5. In the system of claim 4: the combination further comprising anti-friction means interposed between the slideway and slide element.

6. In the system of claim 1: said zero rate spring means comprising a rotatable drum, and a strip of spring stock coiled thereon; said spring strip being pre-stressed toward a condition of minimum radius of curvature wherein the strip tightly encircles the drum; the drum being rotatably mounted on one of said stationary support means and the idler pulley means; the exposed end of the spring strip being anchored to the other of said stationary support means and idler pulley means; said stationary support means including a slideway defining a movement axis transverse to the drum axis; said pulley means including a slide element movable on the slideway along the movement axis as the spring strip winds on or unwinds from the drum; the strip unwinding action being produced as a response of the idler pulley means to an excessively taut belt condition, and the strip winding action being produced as a response of the idler pulley means to an excessively loose belt condition; one of said slideway and slide element having a flat reaction surface receiving the outer surface area of the unwound portion of the spring strip; said reaction surface extending parallel to the slideway movement axis, whereby the strip wind-up force is directed along said axis; and anti-friction means interposed between the slideway and slide element to minimize frictional resistance in the system.

7. In the system of claim 1: said stationary support means comprising a stationary slideway defining a movement axis, said slideway having a flat reaction surface extending parallel to the movement axis; said idler pulley means comprising a slide element movable on the slideway along the movement axis; said zero rate spring means comprising a drum rotatably mounted on the slide element for movement around an axis transverse to the aforementioned movement axis, and a strip of spring stock coiled around the drum, said spring strip being pre-stressed toward a condition of minimum radius of curvature wherein the strip tightly encircles the drum, the exposed end of the strip being anchored to the slideway, and unwound portion of the strip lying against the aforementioned reaction surface so that the strip wind-up force is directed along the aforementioned movement axis.

8. In the system of claim 7: said slide element including captive anti-friction elements rollably engaging the slideway.

9. In the system of claim 1: said stationary support means comprising a stationary slideway defining a slide movement axis and a reaction surface parallel thereto; said idler pulley means comprising a slide element translationally movable on the slideway along the movement axis; said zero rate spring means comprising a drum rotatably mounted on the slideway for movement around an axis transverse to the slide movement axis, and a strip of spring stock coiled around the drum, said spring strip being pre-stressed toward a condition of minimum radius of curvature wherein the strip tightly encircles the drum; the exposed end of the strip being anchored to the slide element, and an unwound portion of the strip lying against the aforementioned reaction surface so that the strip wind-up force is directed along the aforementioned movement axis.

10. In the system of claim 9: said slide element including captive anti-friction elements rollably engaging the slideway.

* * * * *